Nov. 23, 1954  P. H. GILLASPY  2,695,153
THROTTLE CONTROL FOR ENGINES
Filed April 5, 1951
FIG. 1.
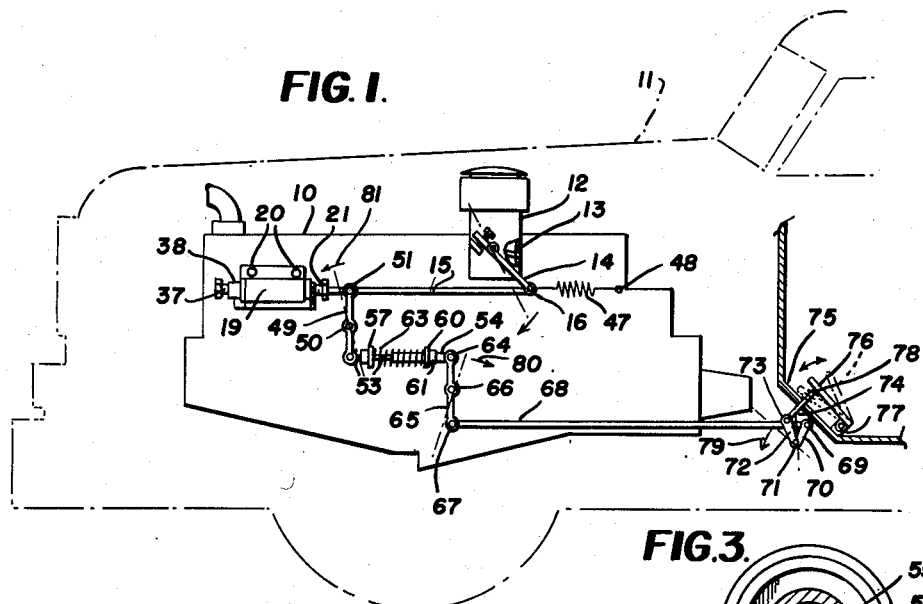
FIG. 2.
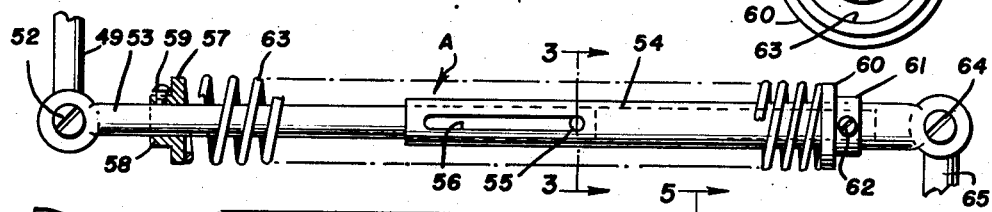
FIG. 3.
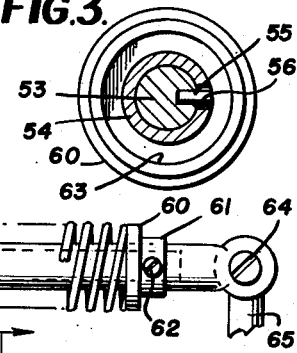
FIG. 4.
FIG. 5.  FIG. 6.
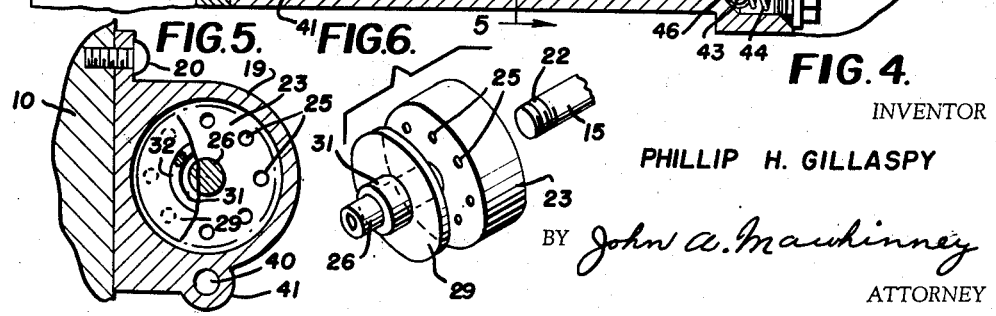
INVENTOR
PHILLIP H. GILLASPY
BY John A. Mawhinney
ATTORNEY

United States Patent Office 2,695,153
Patented Nov. 23, 1954

2,695,153

THROTTLE CONTROL FOR ENGINES

Phillip H. Gillaspy, Fort Kobbe, C. Z.

Application April 5, 1951, Serial No. 219,335

3 Claims. (Cl. 251—54)

The present invention relates to improvements in a throttle control for engines, such as gasoline, diesel, other internal combustion engines or the like and has for an object the provision of a device of this kind which will prevent too rapid an acceleration, gunning or racing of the engine.

Another object of the present invention is to provide an improved device of this character, the use of which will greatly reduce the wear and strain on the engine and the power train of the vehicle.

A further object of the present invention is to provide an improved throttle control which will prevent the quick opening of the throttle to eliminate the induction of a large volume of cooled air which in a great many instances will cause warping of the valves.

A still further object of the present invention is to provide an improved structure which will accomplish the above enumerated desirable objects even when the vehicle to which it is applied is operated by inexperienced or poor operators.

The present invention aims to provide an improved throttle control which comprises relatively few parts, is economical to manufacture and is easy to maintain in proper operating condition.

With the foregoing and other objects in view, the invention will be hereinafter more fully described and more particularly pointed out in the appended claims.

In the drawings, in which the same parts are denoted by the same reference numerals throughout the several views, Figure 1 is a fragmentary diagrammatic view of an automobile with the improved device applied thereto and with parts in section;

Figure 2 is a side elevational view of the spring control rod with parts broken away and parts in section;

Figure 3 is a sectional view taken on the line 3—3 of Figure 2;

Figure 4 is a longitudinal vertical sectional view through the control unit;

Figure 5 is a sectional view taken on the line 5—5 of Figure 4; and

Figure 6 is an exploded view of the diaphragm valve and the piston.

Referring more particularly to the drawings, 10 indicates an internal combustion engine of a motor vehicle 11, the carbureter of which is indicated at 12 having a butterfly throttle valve 13 to which is secured one end of an arm 14. One end of a piston rod 15 is pivotally connected as at 16 to the free end of the arm 14. The opposite end portion of the piston rod 15 extends forwardly and is slidably received through an opening 17 in a rear end wall 18 of a cylinder 19 which is adapted to contain a suitable fluid, such as shock absorber fluid.

The cylinder 19 may be secured to the engine 10 by screws 20 or the like. The outer portion of opening 17 may be enlarged and screw threaded to receive a packing material 21 which embraces the piston rod 15 to permit sliding movement thereof but to prevent leakage of the fluid from the cylinder 19 around the rod 15.

The forward end portion of the piston rod 15 extends into the cylinder 19 and is screw threaded as indicated at 22. A piston 23 has a screw threaded recess 24 for receiving the threaded portion 22 of the piston rod 15. The piston 23 is provided with a plurality of angularly spaced apart axially extending through passageways 25. The size and number of the passageways may be varied to accommodate different working conditions. The outer circumference of the piston 23 has a sliding fit with the interior wall of the cylinder 19 so that fluid may not pass from one side of the piston to the other side between the outer face of the piston and the interior wall of the cylinder.

A stud 26 extends from the forward face of the piston 23 and has a screw threaded socket 27 for the reception of a set screw 28. A diaphragm valve 29 has a through opening 30 for receiving therethrough the stud 26 upon which the valve 29 may have sliding movement. The valve 29 has a forwardly extending collar 31 which is embraced by one end of a coil spring 32. The coil spring encircles the stud 26 and is confined between the valve 29 and a washer 33 which is disposed on the outer end of the set screw 28. The tension of the spring 32 may be adjusted by screwing the set screw into and out of the stud 26. The valve 29 is of such a diameter that it will normally mask the forward ends of the passageways 25 of the piston 23.

The forward wall 34 of the cylinder 19 has an opening 35 therethrough, the sides of which form a valve seat 36 for cooperating with a needle valve 37 which is threadedly received by a hollow extension 38 projecting forwardly from the forward wall 34 of the cylinder 19. A passageway 39 which is formed in the forward wall 34 of the cylinder 19 has one end in communication with the interior of the hollow extension 38 at a point adjacent to the opening 35 in the forward wall 34. The opposite end of the passageway 39 communicates with a longitudinally extending passageway 40 which is formed in the side wall 41 of the cylinder 19.

The rear end of the passageway 40 communicates with a substantially L-shaped passageway 42 formed in the rear end wall 18. Communication between the passageway 40 and the passageway 42 is controlled by a spring loaded check valve comprising a ball 43, a coil spring 44 and a screw threaded plug 45. The ball 43 is normally held on its seat 46 formed at the rear end of the passageway 40 by the spring 44, the tension of which may be adjusted by the plug 45 which is threadedly received by the rear wall 18 of the cylinder 19. The use of this check valve structure is optional, since its inclusion is not necessary for the successful operation of the device.

The forward end of a coil spring 47 is secured to the rear end of the piston rod 15 and the rear end of the spring 47 is secured as at 48 to the engine 10. A lever 49 is pivoted intermediate its end to the engine as at 50. The upper end portion of the lever 49 is pivotally connected as at 51 to the piston rod 15 and the lower end portion of the lever 40 is pivotally connected as at 52 to the forward end of a bar 53 which forms part of a spring control member, generally indicated at A.

The rear end portion of the bar 53 is telescopically received by a tubular member 54. Adjacent its rear end the bar 53 carries a pin 55 which is slidably received by an elongated slot 56 which is formed in the forward end portion of the tubular member 54.

A collar 57 is adjustably mounted upon the bar 53 and has a boss 58 which is provided with a threaded aperture for receiving a set screw 59 by which the collar 57 may be fixed to the bar 53 in the desired adjusted position thereon. A collar 60 is adjustably mounted upon the tubular member 54 and has a boss 61 which is provided with a threaded aperture for receiving a set screw 62 by which the collar 60 may be fixed to the tubular member 54 in the desired adjusted position thereon.

A coil spring 63 encircles the bar 53 and the tubular member 54 and has its opposite ends secured to the collars 57 and 60 in any suitable manner, as by welding or the like. The tension of the spring may be varied by adjusting the collars 57 and 60 along the length of the bar 53 and the tubular member 54.

The rear end of the tubular member 54 is pivotally connected as at 64 to the upper end of a lever 65 which is pivotally mounted as at 66 intermediate its ends on the engine 10. The lower end of the lever 65 is pivotally connected as at 67 to the forward end of a link 68. The rear end of the link 68 is pivotally connected as at 69 to a rear arm 70 of a bell crank lever which is pivotally mounted as at 71 to an adjacent portion of the motor vehicle 11. A forward arm 72 of the bell crank lever is pivotally connected as at 73 to the lower end of a foot accelerator shank 74 which extends upwardly through the floor 75 of the driver's compartment of the vehicle 11 to be secured to the foot accelerator pedal 76.

The pedal 76 is pivotally mounted as at 77 to the floor board 75. A coil spring 78 surrounds the upper portion of the shank 74 and is confined between the floor board 75 and the pedal 76 for returning the pedal to the dotted line position illustrated in Figure 1 of the drawing.

In the operation of the device when the driver of the vehicle depresses the foot accelerator pedal 76, the bell crank lever will be moved in the direction indicated by the arrow 79 shown in Figure 1 of the drawing. This will cause the link 68 to be moved forwardly or to the left, locking at Figure 1 of the drawing. Such forward movement of the link 68 will cause the upper portion of the lever 65 to move rearwardly, that is in the direction indicated by the arrow 80 in Figure 1 of the drawing.

The lever 65 will pull the tubular member 54 rearwardly since, due to the resistance given by the control cylinder, the bar 53 will remain stationary and the spring 63 will be expanded. When the spring has been expanded sufficiently to overcome the resistance of the fluid in the cylinder 19 to the forward movement of the piston 23 in the cylinder, the bar 53 will be moved rearwardly by the spring 63 so that the upper portion of the lever 49 will be moved in the direction indicated by the arrow 81, shown in Figure 1 of the drawing.

This will cause the piston rod 15 and the piston 23 to move forwardly so that the throttle valve 13 will be opened. During this forward movement of the piston 23 the tension of the spring 32 and the pressure of the fluid in the forward portion of the cylinder 19 will keep the diaphragm valve 29 in its closed position so that fluid may not pass from the rear side of the piston 23 to the forward side thereof.

The movement of the piston 23 in a forward direction will cause the fluid in the forward portion of the cylinder to be forced through the opening 35 in the forward wall 34 of the cylinder. The speed with which the piston may travel and consequently the speed with which the throttle valve will be opened depends upon the rate of flow of the fluid through the opening 35. This rate of flow may be regulated by adjustment of the needle valve 37. The fluid which passes through the opening 35 will be returned to the cylinder 19 at the rear side of the piston 23 by passageways 39, 40 and 42; the pressure of the fluid being sufficient to unseat the ball 43.

The opening movement of the bar 53 will be arrested when the pin 55 engages the right hand end of the slot 56. As long as the operator keeps the foot accelerator pedal depressed the throttle valve 13 will remain open since the spring 63 is stronger than the spring 47. When the operator releases the pressure on the foot accelerator pedal 76 the spring 78 will raise the pedal 76 and move the bell crank lever in a direction opposite to that indicated by the arrow 79 shown in Figure 1 of the drawing. This will cause the link 68 to move the lever 65 to the full line position shown in Figure 1 of the drawing causing the tubular member 54 to be moved forwardly which in turn, through the pin 55, which at this time engages the right hand end of the slot 56, will move the bar 53 forwardly to return the lever 49 to the full line position shown in Figure 1 of the drawing.

Such movement of the lever 49 will cause the piston rod 15 to be moved rearwardly to close the throttle valve 13. This action will be augmented by the coil spring 47 which has been expanded by the opening movement of the piston rod 15. As the piston rod 15 moves rearwardly the piston 23 will also be moved rearwardly in the cylinder 19 so that the fluid on the rear side of the piston will be placed under pressure and will flow through the passageways 25 and move the diaphragm valve 29 to open position so that the fluid from the rear side of the piston will flow to the forward side thereof.

The throttle valve 13 will be closed quickly, but it will be noted that even though the foot accelerator pedal be depressed and released in rapid sequence the throttle valve will not be opened and closed at the same rate of speed as the foot accelerator is actuated. The throttle valve 13 can only be opened by a steady continuous pressure on the foot accelerator pedal. Once the throttle valve 13 has been opened it can be retained in the open position by maintaining a continuous pressure upon the foot accelerator pedal 76.

As illustrated in Figure 4 of the drawing, the cylinder 19 may be made in two parts which are connected as by welding or in any other suitable manner after the piston 23 and the elements carried thereby have been assembled within the cylinder.

It is obvious that various changes and modifications may be made in the details of construction and design of the above specifically described embodiment of this invention without departing from the spirit thereof, such changes and modifications being restricted only by the scope of the following claims.

What I claim is:

1. For use with a throttle valve and an accelerator pedal, an improved throttle control comprising a piston rod connected to the throttle valve for opening the throttle valve, a cylinder containing fluid, a piston on said piston rod and working in said cylinder, adjustable means for conducting the fluid from the forward side of said piston to the rear side thereof during forward throttle valve opening movement of the piston, means for conducting fluid from the rear side of the piston to the forward side thereof during rearward movement of the piston, resilient means connected to said piston rod for closing the throttle valve, a pivotally mounted lever connected at one end to said piston rod, a bar pivotally connected to the other end of said lever, a tubular member telescopically receiving said bar and having an elongated slot therein, a pin on said bar and slidably received by said slot, abutments adjustably mounted on said bar and said tubular member, a coil spring having its opposite ends attached to said abutments and embracing said bar and tubular member, a pivotally mounted second lever having one end connected to one end of said tubular member, a link connected to the opposite end of said second lever, a bell crank lever connected to said link and adapted to be connected to said accelerator pedal.

2. An improved throttle valve control comprising a fluid controlled means connected to a throttle valve for opening and closing the throttle valve, a spring controlled device for actuating said means, means for actuating said spring controlled device, means supplementing the valve closing movement of said fluid controlled means, said device comprising a pair of relatively movable members one of which is connected to said fluid control means and the other of which is connected to said means for actuating the spring controlled device, a resilient element, connecting means between said relatively movable members and between each of said connecting means and the respective ends of said resilient element for expanding said resilient element during the movement of said other member of said relatively movable members during the valve opening movement of the device, whereby said resilient element when it has been expanded will cause movement of said one member of said relatively movable members, one of said movable members having an elongated slot therein, and a pin on the other movable member and slidably received by said slot and engaging the end wall of the slot during the valve closing movement of the device to provide a positive driving connection between said relatively movable members.

3. An improved throttle control as claimed in claim 2 characterized by the fact that the said connecting means between the movable members and the ends of the resilient element comprises a separate collar adjustably carried by each of said movable members.

References Cited in the file of this patent

UNITED STATES PATENTS

| Number | Name | Date |
|---|---|---|
| 1,155,669 | McGowan | Oct. 5, 1915 |
| 1,586,097 | McCarthy | May 25, 1926 |
| 2,090,246 | Alexander | Aug. 17, 1937 |
| 2,179,788 | Hinton | Nov. 14, 1939 |
| 2,194,880 | Weaver | Mar. 26, 1940 |
| 2,431,659 | Flounders | Nov. 25, 1947 |

FOREIGN PATENTS

| Number | Country | Date |
|---|---|---|
| 329,895 | Italy | Sept. 26, 1935 |